United States Patent
Stempnik et al.

(10) Patent No.: US 8,041,478 B2
(45) Date of Patent: Oct. 18, 2011

(54) SECURING AND DIAGNOSING THE VEHICLE SPEED INPUT AND DIRECTION FOR TORQUE CONTROL SYSTEMS

(75) Inventors: Joseph M. Stempnik, Warren, MI (US); Richard B. Jess, Haslett, MI (US); Daniel P. Grenn, Highland, MI (US); Tracey A. Bagley-Reed, Canton, MI (US); Ronald W. Van Diepen, Ann Arbor, MI (US); Mark H. Costin, Bloomfield Township, MI (US); Michael A. Turley, Dexter, MI (US); Sandra J. Nelson, Howell, MI (US); Bryan D. Lehman, Fenton, MI (US)

(73) Assignee: GM Global Technology Operations LLC

( * ) Notice: Subject to any disclaimer, the term of this patent is extended or adjusted under 35 U.S.C. 154(b) by 409 days.

(21) Appl. No.: 12/362,843

(22) Filed: Jan. 30, 2009

(65) Prior Publication Data

US 2009/0234534 A1    Sep. 17, 2009

Related U.S. Application Data

(60) Provisional application No. 61/036,589, filed on Mar. 14, 2008.

(51) Int. Cl.
*G06F 19/00* (2011.01)
(52) U.S. Cl. .......................................................... 701/34
(58) Field of Classification Search ................... 701/22, 701/79, 81, 82, 87, 121, 34
See application file for complete search history.

(56) References Cited

U.S. PATENT DOCUMENTS

| 6,295,487 B1 * | 9/2001 | Ono et al. ........................ 701/22 |
| 2005/0080527 A1 | 4/2005 | Tao et al. |

FOREIGN PATENT DOCUMENTS

| DE | 69202128 T2 | 8/1995 |
| DE | 102006040297 | 3/2008 |
| EP | 0531870 A2 | 3/1993 |

* cited by examiner

*Primary Examiner* — Kim T Nguyen (57) ABSTRACT

A vehicle speed module includes a speed arbitration module that receives at least two of a wheel speed, a transmission output speed (TOS), and an electric motor speed (EMS), and that determines a vehicle speed based on a comparison of the at least two of the wheel speed, the TOS, and the EMS. A speed diagnostic module selectively diagnoses a fault in one of a wheel speed sensor, a TOS sensor, and an EMS sensor based on the comparison.

18 Claims, 7 Drawing Sheets

SECURING AND DIAGNOSING THE VEHICLE SPEED INPUT AND DIRECTION FOR TORQUE CONTROL SYSTEMS

CROSS-REFERENCE TO RELATED APPLICATIONS

This application claims the benefit of U.S. Provisional Application No. 61/036,589, filed on Mar. 14, 2008. The disclosure of the above application is incorporated herein by reference.

FIELD

The present disclosure relates to vehicle systems and more particularly to internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate at which fuel is injected to provide a desired air/fuel mixture to the cylinders. Increasing the air and fuel to the cylinders increases the torque output of the engine.

Engine control systems have been developed to control engine torque output to achieve a desired torque. Other vehicle systems, such as a transmission control system, may request that the engine produce torque in excess of torque requested by a driver of the vehicle. For example, the excess torque may be used to eliminate dragging of a wheel of the vehicle, increase vehicle traction, increase vehicle stability, smooth a gear shift, and/or for any other suitable purpose. The excess torque request may be inaccurate if vehicle operating parameters, such as vehicle speed, are incorrectly determined due to sensor and/or hardware failures.

SUMMARY

A vehicle speed module includes a speed arbitration module that receives at least two of a wheel speed, a transmission output speed (TOS), and an electric motor speed (EMS), and that determines a vehicle speed based on a comparison of the at least two of the wheel speed, the TOS, and the EMS. A speed diagnostic module selectively diagnoses a fault in one of a wheel speed sensor, a TOS sensor, and an EMS sensor based on the comparison.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
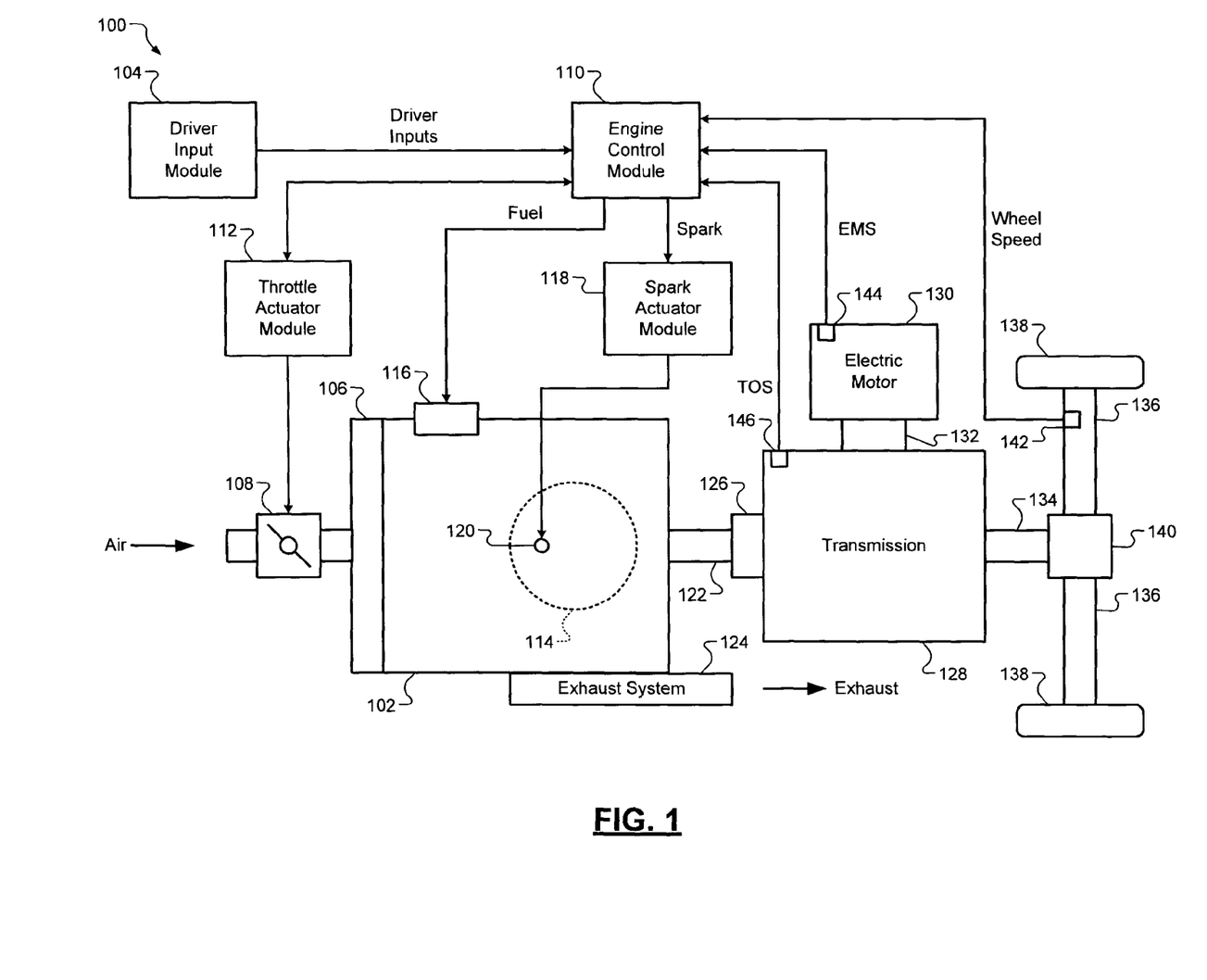
FIG. 1 is a functional block diagram of an exemplary implementation of a vehicle system according to the principles of the present disclosure.

Referring now to FIG. 1, a functional block diagram of a vehicle system 100 is presented. The vehicle system 100 includes an engine 102 that combusts an air/fuel mixture to produce drive torque for a vehicle based on driver inputs provided by a driver input module 104. While a spark ignition, gasoline-type engine is described herein, the present disclosure is applicable to other types of torque producers, including, but not limited to, gasoline-type engines, diesel-type engines, propane engines, and hybrid-type engines implementing one or more electric motors. The driver input module 104 receives the driver inputs from, for example, a pedal position sensor (not shown) that monitors position of an accelerator pedal (not shown) and generates a pedal position signal accordingly.

Air is drawn into an intake manifold 106 through a throttle valve 108. An engine control module (ECM) 110 commands a throttle actuator module 112 to regulate opening of the throttle valve 108 to control the amount of air drawn into the intake manifold 106. Air from the intake manifold 106 is drawn into cylinders of the engine 102. While the engine 102 may include multiple cylinders, for illustration purposes only, a single representative cylinder 114 is shown. For example only, the engine 102 may include 2, 3, 4, 5, 6, 8, 10, and/or 12 cylinders.

The air mixes with fuel provided by a fuel system 116 (e.g., a fuel injector) to form the air/fuel mixture, which is combusted within the cylinders. The ECM 110 controls the amount of fuel injected by the fuel system 116. The fuel system 116 may inject fuel into the intake manifold 106 at a central location or at multiple locations, such as near an intake valve (not shown) of each of the cylinders. While the fuel system 116 is shown as injecting fuel into the intake manifold 106, the fuel system 116 may inject fuel at any suitable location, such as directly into the cylinder 114.

The injected fuel mixes with the air and creates the air/fuel mixture. The air or the air/fuel mixture is drawn into the cylinder 114 through the associated intake valve. A piston (not shown) within the cylinder 114 compresses the air/fuel mixture. Based upon a signal from the ECM 110, a spark actuator module 118 energizes a spark plug 120 that is associated with the cylinder 114, which ignites the air/fuel mixture. The timing of the spark may be specified relative to the time at which the piston is at its topmost position, referred to as to top dead center (TDC), the point at which the air/fuel mixture is most compressed. In other engine systems, such as a compression combustion type engine (e.g., a diesel engine system) or a hybrid engine system, combustion may be initiated without the spark plug 120.

The combustion of the air/fuel mixture drives the piston down, thereby rotatably driving a crankshaft 122. The piston later begins moving up again and expels the byproducts of combustion through an exhaust valve (not shown). The byproducts of combustion are exhausted from the vehicle via an exhaust system 124.

To abstractly refer to the various control mechanisms of the engine 102, each system that varies an engine parameter may be referred to as an actuator. For example, the throttle actuator module 112 can change the opening area of the throttle valve 108. The throttle actuator module 112 can therefore be referred to as an actuator, and the throttle opening area can be referred to as an actuator position. Similarly, the spark actuator module 118 can be referred to as an actuator, while the corresponding actuator position may refer to the timing of the spark delivery.

The ECM 110 adjusts the actuator positions to regulate torque produced by the engine 102 and provide a desired torque output. Torque is output by the engine 102 through a torque converter or other coupling device 126 to a transmission 128. In another embodiment of the present disclosure, the vehicle system 100 is a hybrid vehicle system that includes an electric motor 130 that outputs a torque through a coupling device (such as a torque converter) 132 to the transmission 128. When more torque is desired than the engine 102 is producing, the electric motor 130 may be used to provide additional torque.

The transmission 128 may then transfer torque through a propeller shaft 134 and axle shafts 136 to one or more wheels 138 of the vehicle to propel the vehicle. More specifically, torque produced by the engine 102 and/or the electric motor 130 are multiplied by several gear ratios. The gear ratios are provided by the torque converters 126 and/or 132, the transmission 128, and a differential 140 to provide axle torque at the axle shafts 136.

The ECM 110 monitors rotational speed of the wheels 138 of the vehicle. The rotational speed of one of the wheels 138 is referred to as a wheel speed. The wheel speed is measured by a wheel speed sensor 142. While only the wheel speed sensor 142 is shown, the vehicle system 100 may include more than one wheel speed sensor for each of the wheels 138. The wheel speeds is provided to the ECM 110.

The ECM 110 further monitors an electric motor speed (EMS) of the electric motor 130 and a transmission output speed (TOS) of the transmission 128. The EMS is measured by an EMS sensor 144, and the TOS is measured by a TOS sensor 146. The EMS and the TOS are provided to the ECM 110.

Figure 2:
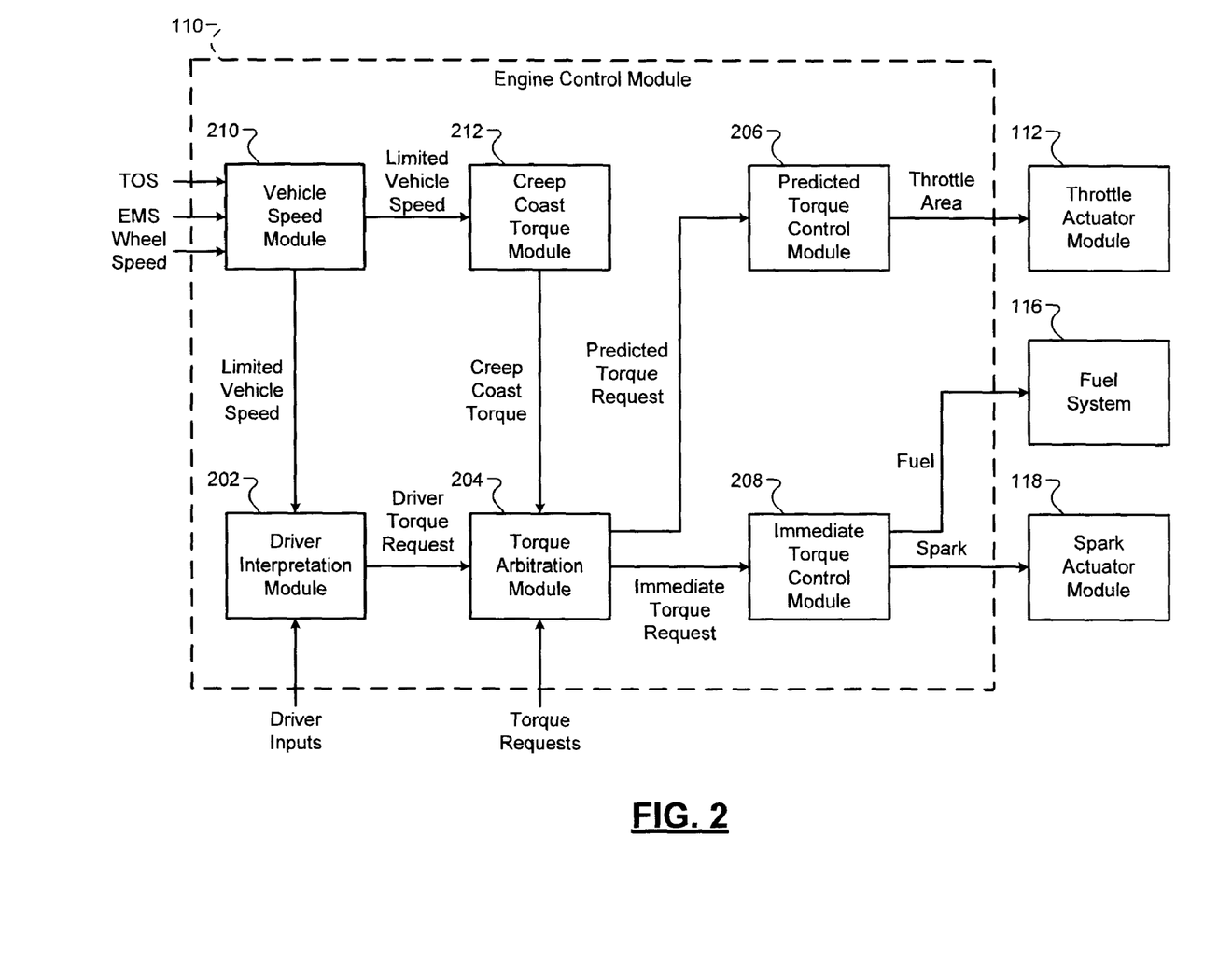
FIG. 2 is a functional block diagram of an exemplary implementation of an engine control module according to the principles of the present disclosure.

Referring now to FIG. 2, a functional block diagram of an exemplary implementation of the ECM 110 is presented. The ECM 110 includes a driver interpretation module 202, a torque arbitration module 204, a predicted torque control module 206, and an immediate torque control module 208. The ECM further includes a vehicle speed module 210. The driver interpretation module 202 generates a driver torque request (i.e., Driver Torque) based on the driver inputs provided to the driver input module 104 and the output from the vehicle speed module 210.

The torque arbitration module 204 arbitrates between the driver torque request and other torque requests, such as a transmission torque request and/or a hybrid engine torque request. For example only, a transmission torque request may be generated to coordinate a gear shift. A hybrid engine torque request may be generated to coordinate operation of the engine 102 and the electric motor 130.

The torque arbitration module 204 also validates the torque requests before arbitration. For example, the torque arbitration module 204 may employ any suitable validation technique, such as a two's compliment check (e.g., a checksum), a rolling counter check, and/or a missing message check. The torque arbitration module 204 determines a predicted torque request and an immediate torque request based on the validated torque requests. More specifically, the torque arbitration module 204 determines how best to achieve the torque requests and generates the predicted and immediate torques accordingly.

The predicted torque is the amount of torque that will be required in the future to meet the driver torque request and/or the driver's speed requests. The immediate torque is the amount of torque required at the present moment to meet temporary torque requests. The immediate torque may be achieved using engine actuators that respond quickly, while slower engine actuators may be targeted to achieve the predicted torque.

For example, the timing of the spark delivery provided to the spark plug 120 and the amount of fuel injected by the fuel system 116 may be adjusted in a short period of time. Accordingly, the spark timing and/or the amount of fuel may be adjusted to provide the immediate torque. The opening of the throttle valve 108 may require a longer period of time to be adjusted. Accordingly, the throttle actuator module 112 may be targeted to meet the predicted torque.

The torque arbitration module 204 outputs the predicted torque request to the predicted torque control module 206 and the immediate torque request to the immediate torque control module 208. The predicted torque control module 206 determines desired actuator positions for slow actuators based on the predicted torque request. The slow actuators may include, for example, the throttle actuator module 112. For example only, the predicted torque control module 206 may determine the desired actuator positions to create a desired manifold absolute pressure (MAP), desired throttle area, and/or desired air per cylinder (APC). The slow actuators then actuate based on the desired actuator positions.

For example, the predicted torque control module 206 generates a desired throttle area signal, which is output to the throttle actuator module 112. The throttle actuator module 112 then regulates the throttle valve 108 to produce the desired throttle area.

The immediate torque control module 208 determines desired actuator positions for fast actuators based on the immediate torque request. The fast actuators may include, for example, the spark actuator module 118 and/or the fuel system 116. For example only, the immediate torque control module 208 may instruct the spark timing to a calibrated timing, such as a minimum best torque (MBT) timing. The MBT spark timing may refer to the minimum spark advance possible (relative to a predetermined timing) at which a maximum amount of torque may be produced. The fast actuators actuate based on these desired actuator positions.

The vehicle speed module 210 receives the TOS, the EMS, and the wheel speed and determines a limited vehicle speed based on the TOS, the EMS, or the wheel speed. For example only, the limited vehicle speed may be used by the creep coast torque module 212 to determine a creep coast torque request (i.e., Creep Coast Torque) that prevents the vehicle from rolling backwards when driving uphill. The vehicle speed module 210 arbitrates between the speeds to determine the limited vehicle speed, diagnoses sources of the speeds, and secures the limited vehicle speed as described herein.

Figure 3:
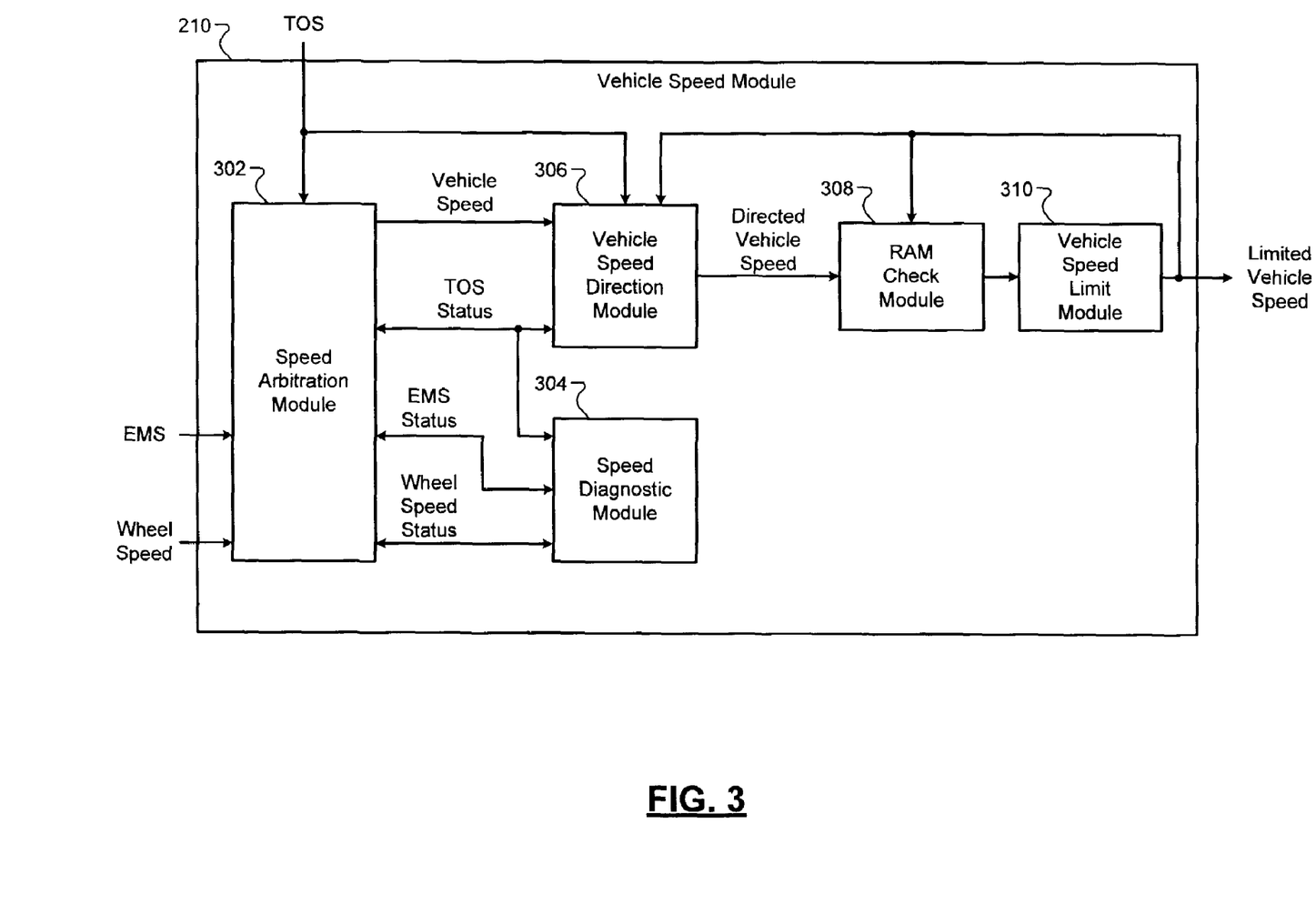
FIG. 3 is a functional block diagram of an exemplary implementation of a vehicle speed module according to the principles of the present disclosure.

Referring now to FIG. 3, a functional block diagram of an exemplary implementation of the vehicle speed module 210 is shown. The vehicle speed module 210 includes a speed arbitration module 302, a speed diagnostic module 304, and a vehicle speed direction module 306. The vehicle speed module 210 further includes a random access memory (RAM) check module 308 and a vehicle speed limit module 310.

The speed arbitration module 302 receives the TOS, the EMS, and the wheel speed and determines a vehicle speed based on the TOS, the EMS, or the wheel speed. To determine the vehicle speed, the speed arbitration module 302 determines whether the TOS, the EMS, and the wheel speed are equal to each other. If the TOS, the EMS, and the wheel speed are equal to each other, the speed arbitration module 302 determines the vehicle speed based on the TOS. The TOS has a higher priority than both the EMS and the wheel speed, and the wheel speed has a higher priority than the EMS speed.

If only two speeds are equal to each other, the speed arbitration module 302 determines the vehicle speed based on the equal speed with the higher priority. For example, if only the EMS and the wheel speed are equal to each other, the speed arbitration module 302 determines the vehicle speed based on the wheel speed, which has a higher priority than the EMS speed. This may apply to a speed arbitration system that determines a vehicle speed based on one of only two speeds, such as a TOS and a wheel speed, for example.

If only two speeds are equal to each other, the speed arbitration module 302 further determines a status signal of the speed that is not equal to the other speeds (i.e., the speed in error) to include an error signal. For example, if only the EMS and the wheel speed are equal to each other, the speed arbitration module 302 determines a TOS status signal (i.e., TOS Status) to include the error signal. In other cases, the speed arbitration module 302 may further determine an EMS status signal (i.e., EMS Status) and a wheel speed status signal (i.e., Wheel Speed Status) to include the error signal.

If only two speeds are equal to each other, the speed arbitration module 302 further determines the status signal of each equal speed to not include the error signal. This may apply to the speed arbitration module using one of only two speeds. If all speeds are equal to each other, the speed arbitration module 302 further determines the status signal of each equal speed to not include the error signal.

If no speeds are equal to each other, the speed arbitration module 302 determines the vehicle speed based on the highest speed. For example, if the TOS, the EMS, and the wheel speed are not equal to each other and the EMS has a higher speed than the TOS and the wheel speed, the speed arbitration module 302 determines the vehicle speed based on the EMS. This may apply to the speed arbitration module using one of only two speeds.

If no speeds are equal to each other, the speed arbitration module 302 further determines the status signal of the highest speed to include a highest error signal. The status signal of each of the lower speeds is determined to include the error signal. For example, if the TOS, the EMS, and the wheel speed are not equal to each other and the EMS has a higher speed than the TOS and the wheel speed, the speed arbitration module 302 determines the EMS status signal to include the highest error signal. The TOS status signal and the wheel speed status signal are determined to each include the error signal. This may apply to the speed arbitration module using one of only two speeds.

The speed diagnostic module 304 receives the TOS status signal, the EMS status signal, and the wheel speed status signal. The speed diagnostic module 304 includes a counter (not shown) that starts to increment when any of the status signals includes the error signal or the highest error signal. The speed diagnostic module 304 determines a diagnostic time based on the counter. If any of the status signals includes the error signal or the highest error signal, the speed diagnostic module 304 increments an error counter for the corresponding speed status signal. For example, if the TOS status signal includes the error signal or the highest error signal, the speed diagnostic module 304 increments a TOS error counter (not shown).

The speed diagnostic module 304 further includes an EMS error counter (not shown) and a wheel speed error counter (not shown). The error counters may be reset during an ignition cycle by a service technician who diagnoses the sources of the speed status signal errors. For example only, the speed diagnostic module 304 may output the data of the error counters in the On-Board Diagnostics II (OBD-II) standard to an OBD-II scan tool (not shown).

Each of the error counters is incremented towards a fault. In other words, if any of the error counters has an amount of errors that is greater than a predetermined value, the speed diagnostic module 304 determines the status signal of the corresponding speed to include a failure signal. For example, each error may correspond to a particular time. Accordingly, the value of an incremented error counter corresponds to a particular period (e.g. a diagnostic time). The failure signal indicates that the corresponding source of speed has failed. For example only, the failure signal may utilize, but is not limited to, the electrical signaling protocols and the messaging format of the OBD-II standard. For example only, the failure signal may be output to the OBD-II scan tool.

For example, if the TOS error counter has an amount of errors that is greater than the predetermined value (e.g. the diagnostic time), the speed diagnostic module 304 determines the TOS status signal to include the failure signal. When the diagnostic time is greater than a predetermined period, the speed diagnostic module 304 ceases incrementing the error counters. The speed diagnostic module 304 resets the counter.

There may be only two sources of speed in the vehicle system 100 due to either the design of the vehicle system 100 or the failure of the third source. If the two speeds were in error but the corresponding sources did not fail during the predetermined period, the speed diagnostic module 304 determines the corresponding status signals to each include the failure signal. In this case, the speed diagnostic module 304 may further output a reduced engine power (REP) mode signal (not shown) that requests that the vehicle system 100 be placed into a REP mode. In the REP mode, the torque requests, such as the driver torque request, are limited.

If all the sources of speed fail during the predetermined period, the speed diagnostic module 304 may output the REP mode signal. The speed diagnostic module 304 resets the error counters. The speed diagnostic module 304 outputs the status signals to the speed arbitration module 302.

When one of the status signals includes the failure signal, the speed arbitration module 302 no longer may use the corresponding speed to determine the vehicle speed. In addition, the speed arbitration module 302 no longer compares the failed speed to another speed. If each status signal includes the failure signal, the speed arbitration module 302 determines the vehicle speed to be zero. This may apply to the speed arbitration module 302 using one of only two speeds.

The vehicle speed direction module 306 receives the TOS, the limited vehicle speed, and the TOS status signal. Since the TOS is the only source of speed that is communicated with a direction, a vehicle speed determined based on the EMS or the wheel speed determines the directed speed to be the positive of the vehicle speed. Thus, if the TOS status signal includes the error signal or the failure signal, the vehicle speed direction module 306 determines the directed vehicle speed (i.e., a vehicle speed with direction) to be the positive of the vehicle speed. If the TOS status signal does not include the error signal or the failure signal, the vehicle speed direction module 306 determines the directed vehicle speed based on the TOS direction. When the sign of the TOS direction is positive or the limited vehicle speed is within a predetermined range of values around zero, the vehicle speed direction module 306 determines the directed vehicle speed to be the positive of the vehicle speed. If the sign of the TOS direction is negative and the vehicle speed is not within the predetermined range of values, the vehicle speed direction module 306 determines the directed vehicle speed to be the negative of the vehicle speed.

The RAM check module 308 receives the directed vehicle speed and the previous limited vehicle speed. The RAM check module 308 determines whether a RAM of the ECM 110 has failures (i.e., runs a RAM check). To determine whether the RAM has failures, the RAM check module 308 stores the limited vehicle speed in two locations of the RAM. The RAM check module 308 determines whether the limited vehicle speed in one location is equal to the duplicate limited vehicle speed in the other location. If the limited vehicle speed values in the two locations do not equal each other, the RAM check module 308 ceases control and may output a fault signal to a scan tool (e.g. such as the OBD-II scan tool).

The RAM check module 308 determines whether the limited vehicle speed in one location is equal to the duplicate limited vehicle speed in the other location. If the limited vehicle speed values in the two locations do not equal each other, the RAM check module 308 returns a previous directed vehicle speed (i.e., a directed vehicle speed of the previous valid calculation) stored in one location of the RAM. The RAM check module 308 further returns a previous duplicate directed vehicle speed stored in another location of the RAM. Additionally, if the limited vehicle speeds in the two locations do not equal each other, the RAM check module 308 ceases control of the vehicle speed module 210 and may output the fault signal to the OBD module. If the limited vehicle speeds in the two locations do equal each other, the RAM check module 308 outputs the directed vehicle speed to the vehicle speed limit module 310.

The vehicle speed limit module 310 applies a vehicle speed limit to the directed vehicle speed to determine the limited vehicle speed. The vehicle speed limit is a predetermined (e.g. via calibration) vehicle speed value added to the previous limited vehicle speed. For example only, the predetermined vehicle speed value may be an added/subtracted offset value, a percentage difference, and/or a particular value above or below the directed vehicle speed. The vehicle speed limit may be based on the vehicle speed that would not result in an excess torque request that would startle the driver.

For example, the vehicle speed limit may include an upper limit and/or a lower limit on the directed vehicle speed. In other words, the directed vehicle speed cannot exceed the vehicle speed limits. The vehicle speed limit corrects for large step changes in the sources of speed due to normal driving conditions and/or hardware failures. A RAM check module and a vehicle speed limit module according to the principles of the present disclosure may apply to a vehicle system that determines a vehicle speed based on only one speed, such as a TOS, for example.

Figure 4:
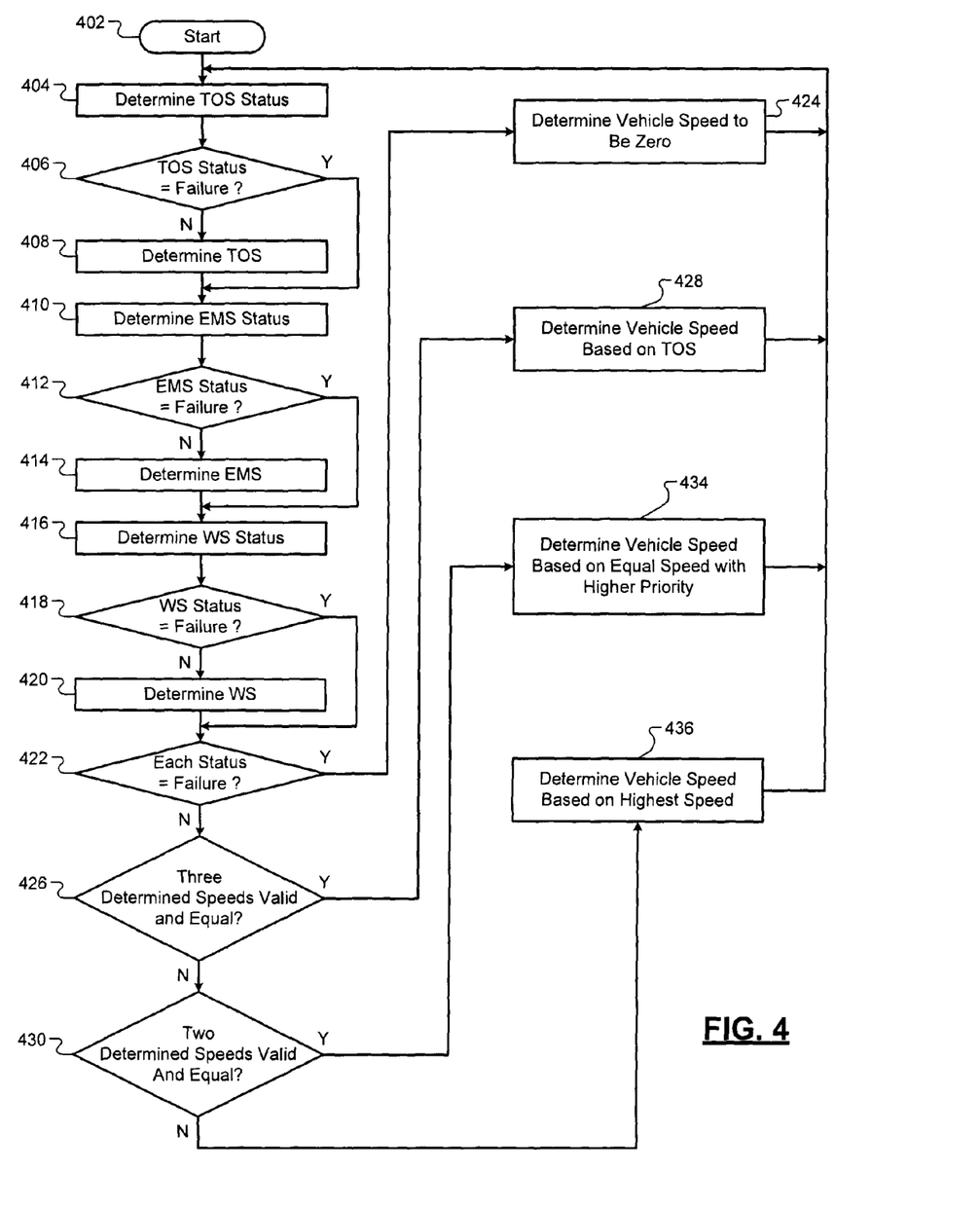
FIG. 4 is a flowchart depicting exemplary steps performed by a speed arbitration module that determines a vehicle speed based on one of three speeds of the vehicle system according to the principles of the present disclosure.

Referring now to FIG. 4, a flowchart depicting exemplary steps of the speed arbitration module 302 is shown. Control begins in step 402. In step 404, the TOS status signal is determined. In step 406, control determines whether the TOS status signal includes the failure signal (i.e., Failure). If false, control continues in step 408. If true, control continues in step 410.

In step 408, the TOS is determined. In step 410, the EMS status signal is determined. In step 412, control determines whether the EMS status signal includes the failure signal. If false, control continues in step 414. If true, control continues in step 416.

In step 414, the EMS is determined. In step 416, the wheel speed (WS) status signal is determined. In step 418, control determines whether the WS status signal includes the failure signal. If false, control continues in step 420. If true, control continues in step 422.

In step 420, the WS is determined. In step 422, control determines whether each status signal (i.e., Status) includes the failure signal. If true, control continues in step 424. If false, control continues in step 426. In step 424, the vehicle speed is determined to be zero. Control returns to step 404. In step 426, control determines whether three of the determined speeds are valid and equal to each other. If true, control continues in step 428. If false, control continues in step 430. In step 428, the vehicle speed is determined based on the TOS.

In step 430, control determines whether two of the determined speeds are valid and equal to each other. If true, control continues in step 434. If false, control continues in step 436. In step 434, the vehicle speed is determined based on the equal speed with the higher priority. In step 436, the vehicle speed is determined based on the highest speed.

Figure 5A:
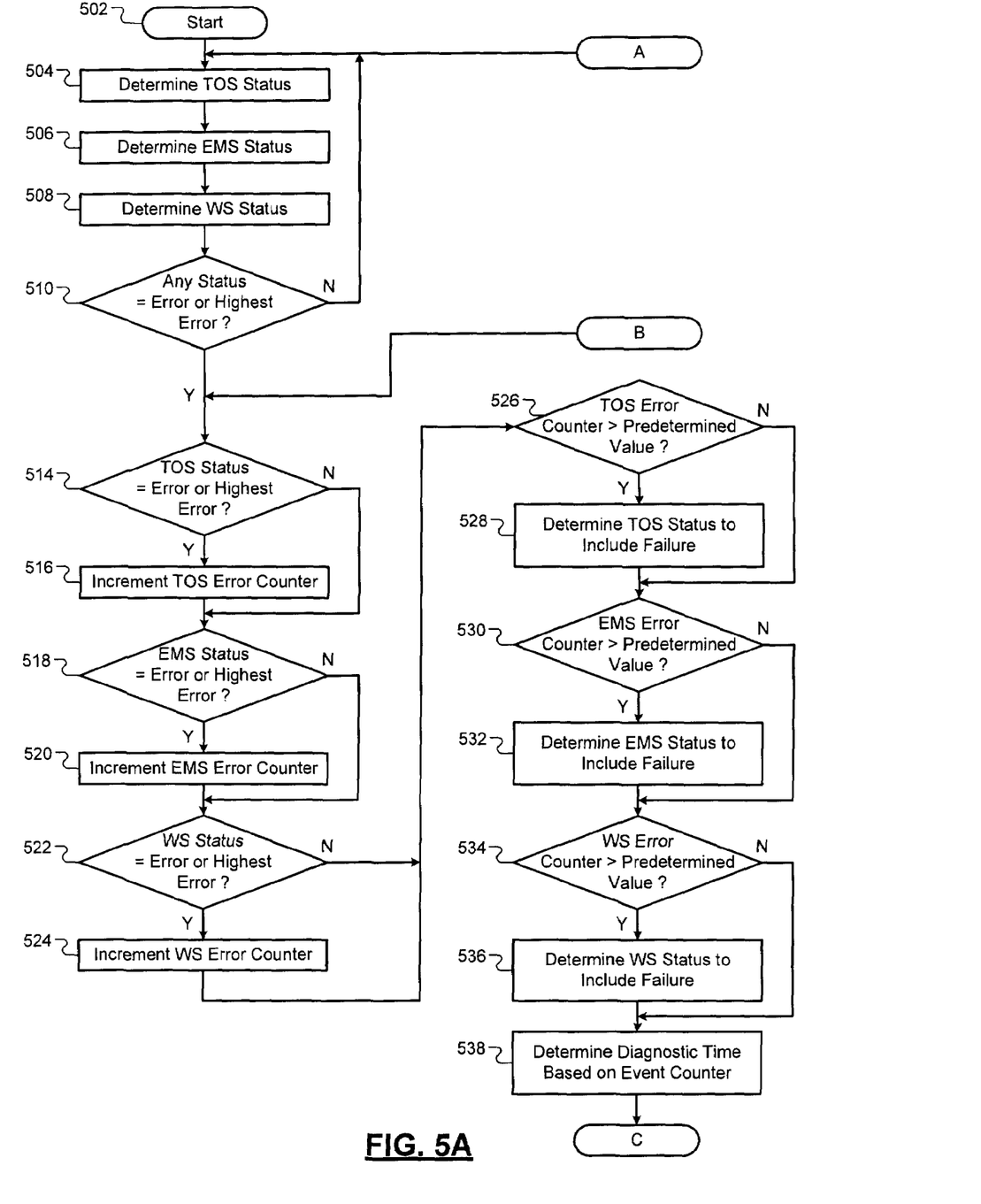
FIG. 5A is a flowchart depicting exemplary steps performed by a speed diagnostic module that diagnoses sources of the speeds of the vehicle system according to the principles of the present disclosure.
Figure 5B:
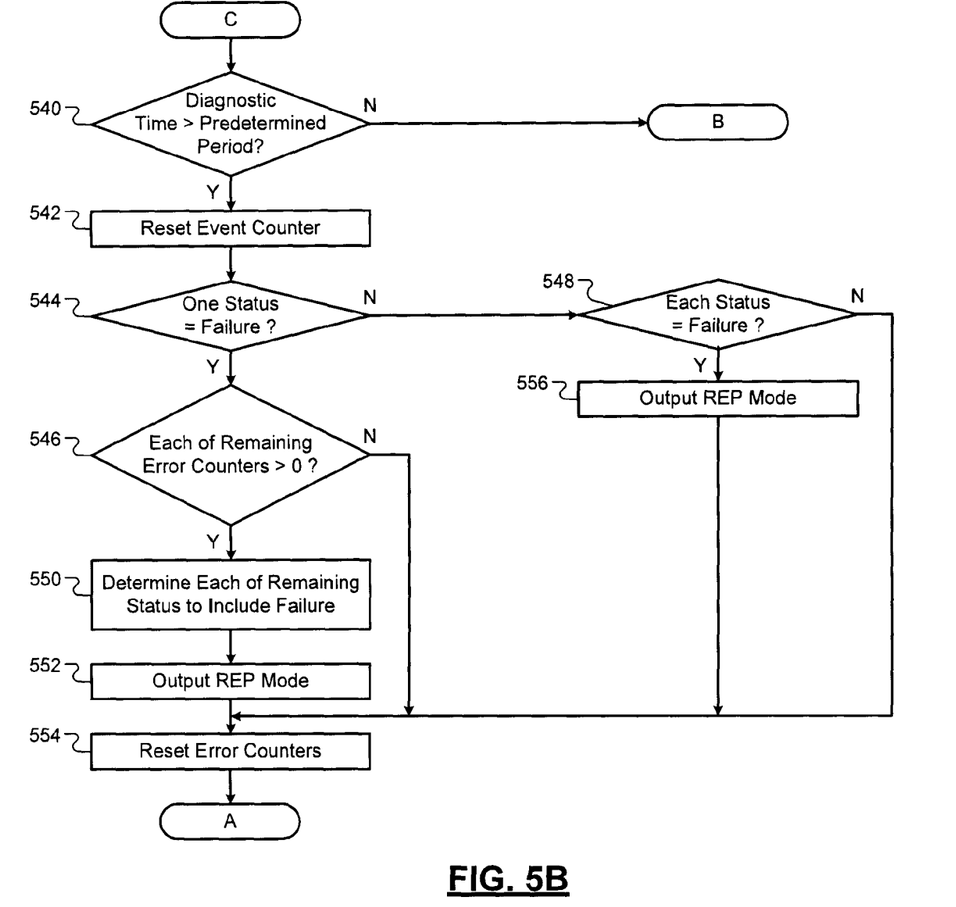
FIG. 5B is a portion of the flowchart of FIG. 5A.

Referring now to FIG. 5A and FIG. 5B, a flowchart depicting exemplary steps performed by the speed diagnostic module 304 is presented. Control begins in step 502. In step 504, the TOS status signal is determined. In step 506, the EMS status signal is determined.

In step 508, the WS status signal is determined. In step 510, control determines whether any of the status signals includes the error signal or the highest error signal. If true, control continues in step 514. If false, control returns to step 504.

In step 514, control determines whether the TOS status signal includes the error signal or the highest error signal. If true, control continues in step 516. If false, control continues in step 518. In step 516, the TOS error counter is incremented.

In step 518, control determines whether the EMS status signal includes the error signal or the highest error signal. If true, control continues in step 520. If false, control continues in step 522. In step 520, the EMS error counter is incremented.

In step 522, control determines whether the WS status signal includes the error signal or the highest error signal. If true, control continues in step 524. If false, control continues in step 526. In step 524, the WS error counter is incremented.

In step 526, control determines whether the TOS error counter is greater than the predetermined value. If true, control continues in step 528. If false, control continues in step 530. In step 528, the TOS status signal is determined to include the failure signal.

In step 530, control determines whether the EMS error counter is greater than the predetermined value. If true, control continues in step 532. If false, control continues in step 534. In step 532, the EMS status signal is determined to include the failure signal.

In step 534, control determines whether the WS error counter is greater than the predetermined value. If true, control continues in step 536. If false, control continues in step 538. In step 536, the WS status signal is determined to include the failure signal.

In step 538, the diagnostic time is determined based on an event counter value. In step 540, control determines whether the diagnostic time is greater than the predetermined period. If true, control continues in step 542. If false, control returns to step 514.

In step 542, the event counter is reset. In step 544, control determines whether only one of the status signals includes the failure signal. If true, control continues in step 546. If false, control continues in step 548. In step 546, control determines whether each of the error counters of the sources of speed that have not failed (i.e., Remaining Error Counters) have an amount of errors that is greater than zero. If true, control continues in step 550. If false, control continues in step 554.

In step 550, each of the status signals that do not include the failure signal (i.e., Remaining Status) is determined to include the failure signal. In step 552, the REP mode signal (i.e., REP Mode) is output to the ECM 110. In step 548, control determines whether each of the status signals includes the failure signal. If true, control continues in step 556. If false, control continues in step 554. In step 556, the REP mode signal is output to the ECM 110. In step 554, the error counters are reset. Control returns to step 504.

Figure 6:
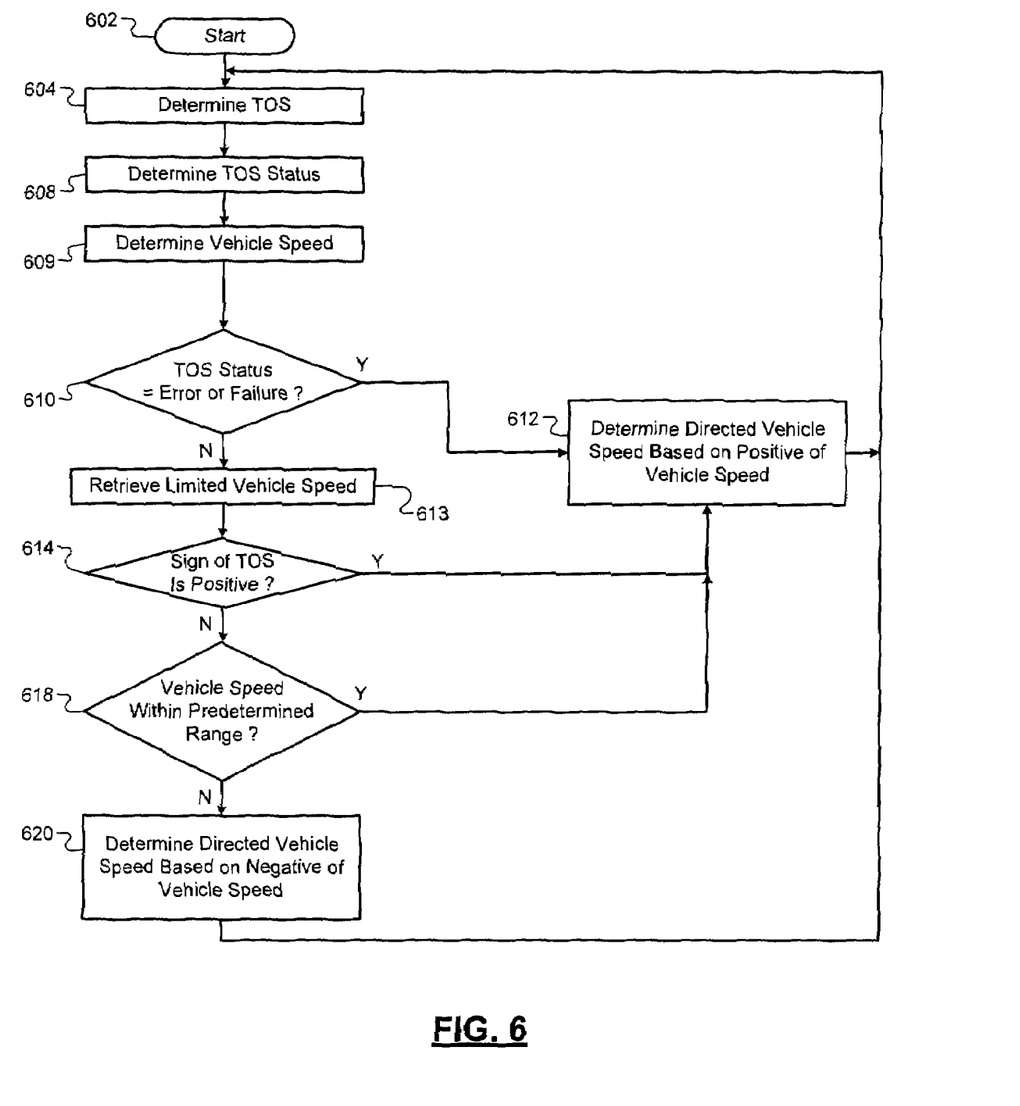
FIG. 6 is a flowchart depicting exemplary steps performed by a vehicle speed direction module according to the principles of the present disclosure.

Referring now to FIG. 6, a flowchart depicting exemplary steps performed by the vehicle speed direction module 306 is presented. Control begins in step 602. In step 604, the TOS is determined. In step 608, the TOS status signal is determined. In step 609, the vehicle speed is determined. In step 610, control determines whether the TOS status signal includes the error signal or the failure signal. If true, control continues in step 612. If false, control continues in step 613. In step 612, the directed vehicle speed is determined based on the positive of the vehicle speed. Control returns to step 604.

In step 613, control retrieves the latest limited vehicle speed. In step 614, control determines whether the sign of the TOS is in the positive direction. If true, control continues in step 612. If false, control continues in step 618. In step 612, the directed vehicle speed is determined based on the positive of the vehicle speed. Control returns to step 604.

In step 618, control determines whether the limited vehicle speed is within the predetermined range around zero. If true, control continues in step 612. If false, control continues in step 620. In step 620, with the TOS in the negative direction, the directed vehicle speed is determined based on the negative of the vehicle speed. Control returns to step 604.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A vehicle speed module comprising:
    a speed arbitration module that receives at least two of a wheel speed, a transmission output speed (TOS), and an electric motor speed (EMS), and that determines a vehicle speed based on a comparison of the at least two of the wheel speed, the TOS, and the EMS; and
    a speed diagnostic module that selectively diagnoses a fault in one of a wheel speed sensor, a TOS sensor, and an EMS sensor based on the comparison.

2. The vehicle speed module of claim 1 wherein the speed arbitration module determines the vehicle speed based on a difference between the at least two of the wheel speed, the TOS, and the EMS and priorities of each of the wheel speed, the TOS, and the EMS.

3. The vehicle speed module of claim 1 wherein the speed arbitration module determines the vehicle speed based on whether the at least two of the wheel speed, the TOS, and the EMS are equal.

4. The vehicle speed module of claim 1 wherein the speed diagnostic module diagnoses the fault based on a number of times the at least two of the wheel speed, the TOS, and the EMS are not equal.

5. The vehicle speed module of claim 1 wherein the speed diagnostic module includes respective counters for the at least two of the wheel speed, the TOS, and the EMS that increment based on whether the at least two of the wheel speed, the TOS, and the EMS are not equal.

6. The vehicle speed module of claim 5 wherein the speed diagnostic module diagnoses the fault when one of the respective counters is greater than a threshold.

7. The vehicle speed module of claim 1 wherein the speed arbitration module does not determine the vehicle speed based on one of the wheel speed, the TOS, and the EMS when the speed diagnostic module diagnoses a fault in a corresponding one of the wheel speed sensor, the TOS sensor, and the EMS sensor.

8. The vehicle speed module of claim 1 further comprising a vehicle speed direction module that selectively determines a directed vehicle speed based on one of the TOS and the vehicle speed.

9. The vehicle speed module of claim 8 wherein the vehicle speed direction module determines the directed vehicle speed further based on a status of the TOS sensor.

10. A method implemented by a vehicle including a wheel speed sensor, a transmission output speed (TOS) sensor, and an electric motor speed (EMS) sensor, the method comprising:
    receiving at least two of:
        a wheel speed from the wheel speed sensor,
        a TOS from the TOS sensor, and
        an EMS from the EMS sensor;
    determining a vehicle speed based on a comparison of the at least two of the wheel speed, the TOS, and the EMS; and
    selectively diagnosing a fault in one of the wheel speed sensor, the TOS sensor, and the EMS sensor based on the comparison.

11. The method of claim 10 further comprising determining the vehicle speed based on a difference between the at least two of the wheel speed, the TOS, and the EMS and priorities of each of the wheel speed, the TOS, and the EMS.

12. The method of claim 10 further comprising determining the vehicle speed based on whether the at least two of the wheel speed, the TOS, and the EMS are equal.

13. The method of claim 10 further comprising diagnosing the fault based on a number of times the at least two of the wheel speed, the TOS, and the EMS are not equal.

14. The method of claim 10 further comprising providing respective counters for the at least two of the wheel speed, the TOS, and the EMS that increment based on whether the at least two of the wheel speed, the TOS, and the EMS are not equal.

15. The method of claim 14 further comprising diagnosing the fault when one of the respective counters is greater than a threshold.

16. The method of claim 10 further comprising determining the vehicle speed without one of the wheel speed, the TOS, and the EMS when a fault is diagnosed in a corresponding one of the wheel speed sensor, the TOS sensor, and the EMS sensor.

17. The method of claim 10 further comprising selectively determining a directed vehicle speed based on the TOS and the vehicle speed.

18. The method of claim 17 further comprising determining the directed vehicle speed further based on a status of the TOS sensor.

* * * * *